United States Patent Office 2,799,156
Patented July 16, 1957

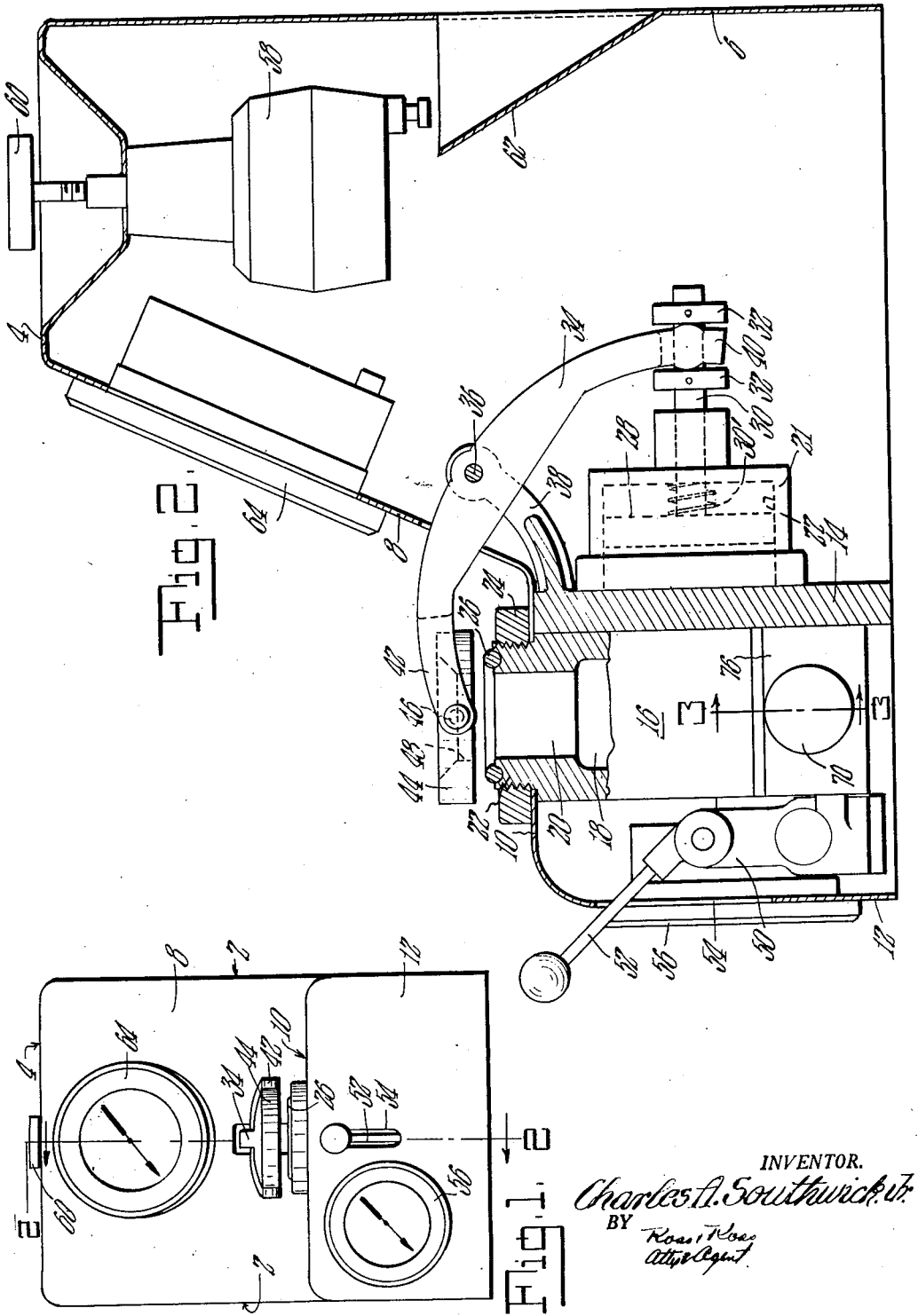

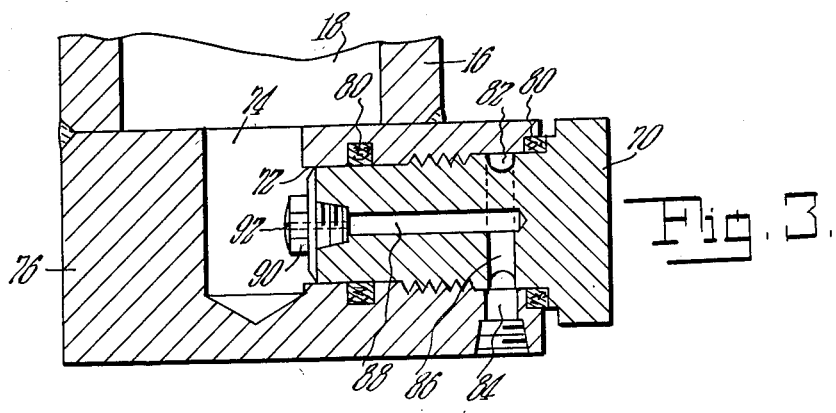

2,799,156

APPARATUS FOR TESTING COATED POROUS MATERIAL

Charles A. Southwick, Jr., Hope, N. J., assignor to The B. F. Perkins & Son, Inc., Chicopee, Mass., a corporation of Massachusetts Application April 11, 1955, Serial No. 500,537

2 Claims. (Cl. 73—38)

This invention relates to testing apparatus and more particularly to machines for determining the degree of adhesion between coatings and the base materials to which they are applied.

The principal objects of the invention are directed to the provision of a novel machine for testing and indicating the degree of adhesion between coating material and the material to which it is applied.

It is common practice to coat various web and sheet materials such as paper, cloth and the like with coatings of various types and kinds for numerous and various purposes of utility and ornamentation. Resinous coatings of numerous types have been widely employed for paper, fabric and the like but the novel features of this invention are not limited thereto.

According to the novel features of the invention a machine is provided with a chamber having an orifice of known area over which a test specimen of coated material such as paper, cloth or the like is clamped with the coated side uppermost. Paper, fabrics and numerous base materials which are coated are more or less porous and air at a regulated predetermined pressure supplied the chamber is exerted through the orifice and against the specimen so that it seeps or leaks through the base material and against the coating.

Air pressure tends to lift or separate the coating from the material so that it can be known at what pressure the adhesion between the coating and material fails and it can be known that adhesion does not fail at a certain pressure.

Certain standards may be established for the determination of what constitutes acceptable and non-acceptable adhesion between various coating materials and the base materials coated thereby.

In a general way the machine of the invention embodies; air pressure and regulating means to supply air at the desired predetermined pressure, filter means to eliminate moisture in the air and means to indicate pressures all to the end that the characteristics of adhesion between coatings and base materials coated thereby may be determined with relation to such standards as may be established.

All of the above cited objects I accomplish by means of such structure and relative arrangement of parts thereof, as will fully appear by a perusal of the description below and by various specific features which will be hereinafter set forth.

To these above and other ends and with the foregoing and various other and ancillary features and advantages and objects of my invention as will become more readily apparent as the description proceeds, my invention consists in certain features of novelty, in a mode of operation, and in the combination, organization, and arrangement of parts as will be hereinafter more particularly pointed out in the claims hereunto annexed and more fully described and referred to in conjunction with the accompanying drawings wherein:

Fig. 1 is a front elevational view of testing apparatus embodying the novel features of the invention;

Fig. 2 is a sectional elevational view on the line 2—2 of Fig. 1;

Fig. 3 is a sectional elevational view on the line 3—3 of Fig. 2; and

Fig. 4 is a diagrammatic view showing connections between the components of the apparatus shown in Figs. 1 and 2.

Referring now to the drawings more in detail the novel features of the invention will be fully described.

A housing is provided, which is preferably formed from sheet metal to have side walls 2, upper wall 4, rear wall 6, a sloping upper front wall 8, a front horizontal wall 10, and a lower front wall 12.

A base member 14 is secured within the side walls 2 and wall 12 and a cylinder 16 is secured in suitable manner to the forward side thereof and has a chamber 18.

A clamp cylinder 21 is secured to the rear side of the base member 14 and has a bore 22 therein.

The chamber 18 of the cylinder 16 is closed at its bottom end and has an orifice 20 from the chamber at its upper end. A neck portion 22 extends through the wall portion 10 of the housing which is threaded and a ring 24 in engagement therewith clamps the wall 10 and member 16 together.

The upper end of the neck is provided with an annular support 26 for a specimen to be tested. Said support 26 may be formed from rubber, composition or the like so as to be somewhat yieldable.

A piston 28 is reciprocable in the cylinder 21 and a rod 30 thereof extending outside the cylinder has spaced collars 32 fixed thereto. A lever 34 pivoted intermediate its ends at 36 between spacer ears 38 extending from the member 14 has a lower forked end 40 between the collars 32 and around the rod 30.

An upper end of the lever 34 has transversely spaced portions 42 at outer opposite sides of a clamp member 44 which are pivoted to the member 44 at 46. Said clamp member is provided with an opening 48 therethrough.

As air is admitted to the cylinder 21 the piston 28 acts to swing lever 34 counterclockwise so that the clamp member operates to clamp a specimen to the member 26. With coating of the specimen uppermost air admitted to chamber 18 acts through the base material of the specimen on the coating.

A valve 50 is provided for admitting air to the cylinder 21 and to the chamber 18 and has an operating lever 52 extending through a slot 54 of the front wall 12.

A pressure gauge 56 is secured to the front wall 12 and is connected to the chamber 18 for indicating pressure therein.

A pressure regulating valve device 58 is suspended from a depressed portion of the upper wall 4 and is adapted to receive compressed air from a suitable supply system. Said valve is adapted for adjustment by member 60 thereof to provide air of predetermined pressure to the apparatus. Said valve 58 will preferably be provided with filter means to remove moisture from the air which may be discharged into an inwardly disposed portion 62 of the rear wall 6.

A pressure gauge 64 is carried by the wall 8 for indicating air pressure from the valve 58.

Air is supplied the chamber 18 through a relatively small port as will be explained in connection with Fig. 3.

A nozzle carrier 70 is in threaded engagement with a transverse bore 72 leading into a bore 74 at the lower side of the chamber 18. Bores 72 and 74 are provided in a member 76 secured to the lower end of member 16 as by welding, as shown.

Packings 80 are provided around the carrier, as shown, and an annular groove 82 around member 70 is in register with an air inlet 84. A transverse passageway 86 intersects a longitudinal passageway 88.

A delivery nozzle 90 in the end of the passageway has a relatively small discharge port 92 so that air is delivered into the chamber rather slowly.

The components are connected as shown diagrammatically in Fig. 4. Piping or tubing connects the components and a section 100 connects the pressure regulating valve 58 to the gauge 64 and operating valve 50. The valve 50 is connected to the cylinder 21 and through nozzle 90 to chamber 18 by connections 102 and 104. The chamber 18 is connected to gauge 56 by 106.

The operation of the apparatus will be described and while pressures are referred to it will be understood that the apparatus is adapted for a wide range of pressures.

It will be assumed that the pressure regulator 58 or reducer is connected to a source of compressed air. There are numerous forms of commercial regulators or reducers available for the purpose. It may be assumed that air pressure to the regulator is greater than 50# p. s. i. and that said regulator is adjusted so as to supply air to indicate 50# p. s. i. on gauge 64.

A coated specimen say four or five inches square is placed on the member 26 with the coated side uppermost.

Valve 50 is opened so that air at 50 pounds pressure is supplied the cylinder 21 and chamber 18. The piston of cylinder 21 acts through its rod to swing lever 34 so that the specimen clamp descends and clamps the specimen to the member 26.

Air is admitted slowly to the chamber 18 through the port 92 of the nozzle which port is of relatively small area. It is desirable that pressure in the chamber gradually reach the maximum say over a period of twenty to twenty-five seconds or so. The rise in pressure may be visualized in gauge 56.

Air acts on the coating through the base material and any appreciable tendency of the coating to separate from the material may be seen in the opening of the specimen clamp.

When the pressure indicated by gauge 56 corresponds to that indicated by gauge 64 air pressure in the chamber 18 is at maximum and valve 50 may be closed to allow pressure in the chamber 18 and cylinder 21 to exhaust therefrom to atmosphere so that the specimen is released for examination.

From the specimen it can be determined whether; there is uniform separation of the coating from the base material and rupture of the coating, non-uniform separation and more or less of a blister formation, or no well defined separation and evidence of pin holes in the coating.

By the selection of various pressures and time cycles with relation to base materials of various characteristics and coatings of numerous types the adhesion characteristics between coatings and base materials may be determined.

A spring 30' around rod 30 functions to urge piston 28 in the non-clamping direction of movement of lever 34.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus for determining adhesion characteristics between a specimen having a base of relatively porous material and a coating thereon comprising in combination, a supporting structure provided with a clamp cylinder, an air pressure chamber separate therefrom having an orifice at its upper end to underlie a specimen, a specimen support ring around the orifice, a piston reciprocable in the cylinder in clamping and non-clamping directions and provided with a rod, a lever, a pivotal connection between an intermediate portion of said lever and said supporting structure, one end of said lever being disposed over said specimen support ring and having an apertured specimen clamp ring pivoted thereto for clamping a specimen to said specimen support ring in the clamping position of said lever, operative connections between an opposite end of said lever and piston rod for the swinging of said lever in clamping and non-clamping directions accordingly as said rod is reciprocated in opposite directions by said piston, said air pressure chamber having an air inlet thereinto, and air conducting means for conducting air of predetermined pressure simultaneously to the clamp cylinder and air pressure chamber for acting on said piston and to the air inlet into said chamber, the air inlet being relatively restricted whereby air admitted to said chamber reaches the predetermined pressure and acts on a specimen over the orifice subsequent to operation of said piston and lever to clamp a specimen over the orifice.

2. Apparatus set forth in claim 1 wherein, said air conducting means includes, an air pressure regulating device for connection to air under pressure, a valve connected thereto, and piping connecting said valve and cylinder and restricted orifice.

References Cited in the file of this patent
UNITED STATES PATENTS

| | | |
|---|---|---|
| 1,116,118 | Putnam | Nov. 3, 1914 |
| 2,340,733 | Clark | Feb. 1, 1944 |
| 2,398,051 | Shaw | Apr. 9, 1946 |
| 2,574,475 | Grogan | Nov. 13, 1951 |
| 2,667,782 | Shea | Feb. 2, 1954 |
| 2,679,753 | Flamm | June 1, 1954 |